United States Patent [19]

Gaddy et al.

[11] Patent Number: 4,608,245

[45] Date of Patent: Aug. 26, 1986

[54] METHOD OF SEPARATION OF SUGARS AND CONCENTRATED SULFURIC ACID

[76] Inventors: James L. Gaddy, 964 Arlington Ter.; Edgar C. Clausen, 2425 Sharon St., both of Fayetteville, Ark. 72701

[21] Appl. No.: 788,397

[22] Filed: Oct. 17, 1985

[51] Int. Cl.[4] .................. C01B 17/74; C01B 17/90; C13K 1/02; B01D 59/30

[52] U.S. Cl. .................. 423/531; 423/527; 127/37; 127/40; 127/46.2; 127/51

[58] Field of Search .............. 423/522, 531, DIG. 1, 423/DIG. 2, 525, 527; 127/37, 40, 46.2, 53, 70, 51

[56] References Cited

U.S. PATENT DOCUMENTS

| 2,109,503 | 3/1938 | Reich | 127/53 |
|---|---|---|---|
| 2,130,029 | 9/1938 | Reich | 127/53 |
| 2,567,060 | 9/1951 | Docal | 127/53 |
| 3,186,809 | 6/1965 | Kreevoy et al. | 423/658.5 |
| 3,862,298 | 1/1975 | Beltz et al. | 423/522 |
| 3,870,060 | 3/1975 | Liljenzin et al. | 423/488 |
| 4,036,939 | 7/1977 | Duhayon et al. | 423/488 |
| 4,058,411 | 11/1977 | Bellamy et al. | 127/37 |
| 4,064,220 | 12/1977 | Alon | 423/531 |
| 4,115,530 | 9/1978 | Coenen et al. | 423/488 |
| 4,116,712 | 9/1978 | Othmer | 127/53 |
| 4,237,110 | 12/1980 | Forster et al. | 127/37 |
| 4,259,309 | 3/1981 | Coenen et al. | 423/481 |
| 4,266,981 | 3/1981 | Tsao et al. | 127/37 |
| 4,285,924 | 8/1981 | Pratt | 423/531 |
| 4,291,007 | 9/1981 | Baniel | 423/531 |
| 4,296,078 | 10/1981 | Tellis | 423/488 |
| 4,440,734 | 4/1984 | Kougioumoutzakis | 423/DIG. 2 |

FOREIGN PATENT DOCUMENTS

| 1246694 | 8/1967 | Fed. Rep. of Germany | 423/531 |
|---|---|---|---|
| 55-10421 | 1/1980 | Japan | 423/531 |
| 60-106540 | 6/1985 | Japan | 127/46.2 |
| 376322 | 7/1932 | United Kingdom . | |

Primary Examiner—Gary P. Straub
Attorney, Agent, or Firm—Dorsey & Whitney

[57] ABSTRACT

A method of recovering concentrated sulfuric acid from the product obtained from the acid hydrolysis of a cellulose-containing material such a biomass. The method involves contacting the product with an extraction solvent comprising one or more of the $C_4$–$C_7$ alcohols as the major component to separate the product into a sulfuric acid enriched phase. The sulfuric acid from this enriched phase is then separated and recovered by a further extraction procedure.

9 Claims, 3 Drawing Figures

METHOD OF SEPARATION OF SUGARS AND CONCENTRATED SULFURIC ACID

BACKGROUND OF THE INVENTION

The present invention relates generally to a method of recovering sulfuric acid from a mixture of sugars and concentrated sulfuric acid, and more particularly, to a method of recovering sulfuric acid from the hydrolyzate product obtained from the acid hydrolysis of biomass.

As a result of the continual depletion of nonrenewable energy sources and the rapid escalation of energy prices, various energy conservation measures have been encouraged and alternative energy sources have been proposed and studied. Among the proposed alternative enegy sources, current research has focused heavily on the use of biomass as a viable energy source.

Biomass is composed of three major materials: cellulose, hemicellulose and lignin in ratios of roughly 4:3:3. This composition enables biomass to be a versatile alternative energy source since cellulose is a polymer of hexose rings and hemicellulose is a polymer composed of hexose and pentose rings. These polymer chains may be broken and converted to sugars and other chemicals through various chemical, microbial or fermentation processes.

The principal sources of lignocellulosic biomass are agricultural crops, agricultural residues, forest products, and municipal waste. Biomass is particularly attractive as an alternative energy source since it is available in large quantities and is renewable. It can also be converted to a variety of chemicals and its conversion need not create air pollution problems. Instead, such conversion can assist in alleviating municipal waste problems.

To optimize the conversion of biomass to energy producing fuels and other valuable chemicals, it is necessary to fractionate the crude biomass to the sugar monomers: glucose and xylose. The most common method used in accomplishing this conversion is acid hydrolysis. In general, the acid hydrolysis of biomass requires either high temperatures and dilute acid or high acid concentrations and low temperatures to obtain acceptably high sugar yields. The high temperature/dilute acid process has the advantage of not requiring acid recovery, because of the relatively inexpensive dilute acid being utilized. However, this process has the disadvantage of suffering low sugar yields caused by the degradation of sugars at the high temperatures needed.

The high acid concentration/low temperature process produces high sugar yields, but the economic success of the process requires acid recovery. Accordingly, it is recognized that for the conversion of biomass to sugars and other usable chemicals through the use of concentrated acids to be economically feasible, the process must include an efficient acid recovery procedure. Typically, dilute acid processes involve acid concentrations of 5% or less, while concentrated acid processes involve acid concentrations of 10% or more.

The principal method of treating the hydrolyzate solution containing sulfuric acid and sugars has been neutralization with lime and removing the sulfate salts as gypsum. A more economical method of recovery is by diffusion dialysis or electrodialysis. The Hokkaido process, commercialized in Japan in the early 1960's, reportedly utilized this technology. The disadvantages of this method include the high capital costs for the equipment and the difficulties associated with both obtaining complete acid/sugar separation and a high acid concentration.

Accordingly, there is a need in the art for a method of recovering concentrated sulfuric acid from a sugar/sulfuric acid product obtained from the acid hydrolysis of biomass or other cellulose materials. A further need is a method to separate concentrated sulfuric acid and still permit subsequent recovery of the sugars.

SUMMARY OF THE INVENTION

In accordance with the present invention, concentrated sulfuric acid can be recovered from the sugar/sulfuric acid mixture obtained from the acid hydrolysis of biomass through a procedure involving solvent extraction. Specifically, the process of the present invention involves contacting the hydrolyzate solution in an extraction device with any of the $C_4$–$C_7$ alcohols, mixtures of these alcohols, or solutions in which these alcohols are a major component. This initial extraction results in the separation of the hydrolyzate into an acid-rich extract phase and a glucose-rich raffinate phase. In accordance with the preferred procedure, the glucose-rich phase, which still contains a small amount of residual sulfuric acid, is neutralized by the addition of lime or other similar material to remove the sulfuric acid. This yields a glucose solution for fermentation or processing in another manner.

The acid-rich extract phase is then extracted with another solvent such as benzene, carbon tetrachloride or toluene to remove the alcohol. The sulfuric acid stream from this second extraction is available for reuse in the hydrolysis of other cellulosic materials. The solvent added in the second extraction is separated from the $C_4$–$C_7$ alcohol (the first extraction agent) by distillation. The separated $C_4$–$C_7$ alcohol is then recycled for use in the first extraction procedure described above, while the separated second extraction solvent is recycled for use in the second extraction procedure.

Accordingly, it is the object of the present invention to provide a method of recovering sulfuric acid from a sugar/sulfuric acid mixture.

Another object of the present invention is to provide an efficient and economical method of recovering sulfuric acid from a sugar/sulfuric acid mixture obtained from the acid hydrolysis of biomass.

A further object of the present invention is to provide a method of recovering sulfuric acid using an extraction procedure.

These and other objects of the present invention will become apparent with reference to the drawings, the description of the preferred method and the appended claims.

DESCRIPTION OF THE PREFERRED METHOD

While the preferred method of the present invention has application to any procedure in which it is desired to recover concentrated sulfuric acid from a stream containing concentrated sulfuric acid and sugars, it has particular application in a process for recovering concentrated sulfuric acid from the hydrolyzate produced from the acid hydrolysis of biomass. There are a number of methods utilized in the acid hydrolysis of biomass or other cellulose-containing materials for producing a hydrolyzate having a composition of sugars, water and concentrated sulfuric acid. Those for which the present invention would have the greatest applicability, however, are those involving low temperatures and high acid concentrations.

In a typical process involving the acid hydrolysis of biomass using concentrated sulfuric acid, the acid concentration is generally about 20% or greater. The method of the present invention is applicable to these concentrations of sulfuric acid and additionally, is applicable for the recovery of sulfuric acid as low as about 10%. Thus, for purposes of the present method, a concentrated acid will be considered as any concentration greater than about 10%.

Figure 1:
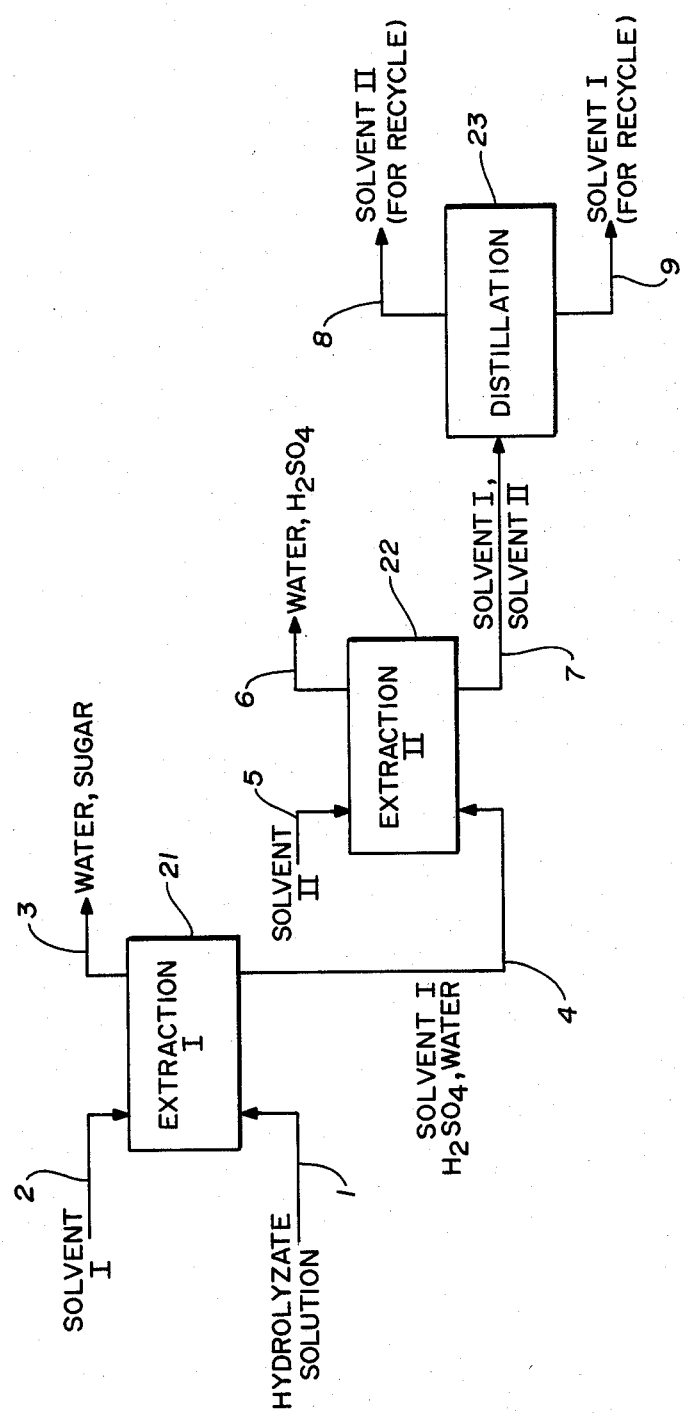
FIG. 1 is a schematic diagram of the solvent extraction sulfuric acid recovery process in accordance with the present invention.

With reference to the schematic diagram illustrated in FIG. 1, the preferred procedure involves exposing the hydrolyzate provided via stream 1 to an extraction solvent ("Solvent I") in the extraction column 21. The Solvent I is provided via stream 2. The hydrolyzate is the product of the acid hydrolysis of biomass and is a composition containing primarily sulfuric acid ($H_2SO_4$), sugars in the form of glucose and xylose, and water. The percentage of each of these compositions will depend upon the concentration of acid utilized in the acid hydrolysis procedure and also on the efficiency of such procedure in converting cellulose and related materials to sugars. Normally, however, it is contemplated that the hydrolyzate stream 1 will contain a sugar component between about 5% and 20%. It is also contemplated that the concentration of sulfuric acid in this hydrolyzate will be between about 20% and 75% on a glucose-free basis, although it is possible for the sulfuric acid concentrations to be outside this range. For purposes of describing the preferred method, the ratio of the flow of hydrolyzate in stream 1 to Solvent I in stream 2 is approximately 1:3. Stream 1 contains approximately 55% sulfuric acid (61% on a sugar-free basis), 40.5% water and 4.5% sugars.

The hydrolyzate is directed to the countercurrent solvent extraction column 21 where the hydrolyzate is extracted with any one of the $C_4$–$C_7$ alcohols, mixtures of such alcohols or other solvent mixtures in which at least one of such alcohols is a major component. In the preferred procedure, the hydrolyzate solution which is provided to the extraction column 21 through stream 1 contains 61% by weight sulfuric acid on a glucose or sugar-free basis together with portions of sugars (glucose, xylose or both) and water. Normally the sugar concentration will be expected to be between 5% and 20% by weight on an acid-free basis. In the preferred system, however, stream 1 will contain 40.5% water and 4.5% sugars.

In the extraction column the sulfuric acid will be preferentially extracted from the glucose/water solution. In the procedure of the present invention, it is contemplated that the extraction column 21 can be any conventional extraction column, either countercurrent or co-current. However, a countercurrent column is preferred. The column 21 must be constructed of materials which are resistant to the acid environment of the materials which will come in contact with the column. An acceptable extraction column is a Karr extraction column.

In the extraction column 21, the hydrolyzate is fed from the bottom through the stream 1 while the extraction solvent is fed from the top through the stream 2 so that the two streams pass through the extraction column 21 countercurrently. During exposure and mixing of these two streams in the column 21, sulfuric acid is preferentially extracted by the solvent and exits from the column 21 in an acid-rich extract phase through stream 4. A glucose-rich raffinate phase is removed overhead from the extraction column 21 through stream 3.

It should be noted that in the preferred procedure, the extraction column 21 is operated at atmospheric pressure and at temperatures slightly above room temperature (i.e. 25°–35° C.). It is contemplated, however, that the procedure can be carried out at other temperatures and pressures as well. As with any extraction process, the efficiency of the extracting procedure can normally be increased by increasing the number of stages in the extraction column. Although an extraction column with any number of stages will be effective to obtain the benefits of the present invention, an extraction column having 10 to 20 stages is preferred. It should also be noted that preferably the hydrolyzate and the extraction solvent are fed through streams 1 and 2, respectively, in a ratio of approximately 1:3.

The phase behavior of the hydrolyzate, when extracted with an appropriate extraction solvent, is determined by the ability of the solvent to preferentially extract sulfuric acid from the hydrolyzate. A common way of obtaining information regarding this ability is by developing phase equilibrium data for the system and displaying such data in a ternary phase diagram. The inventors have done this for certain of the $C_4$–$C_7$ alcohols including heptanol, hexanol, n-amyl alcohol, iso-amyl alcohol and isobutanol. Heptanol appears to have the ability to extract the largest concentrations of sulfuric acid, and is therefore preferred. Using heptanol as the extracting solvent, virtually all of the sulfuric acid can be extracted from hydrolyzate solutions containing concentrations of sulfuric acid as high as 73%. The other $C_4$–$C_7$ alcohols exhibited a more limited ability to extract high concentrations of sulfuric acid, but sufficient ability to be considered for most hydrolyzate solutions. Specifically, hexanol was shown to have the ability to extract virtually all of the sulfuric acid from solutions containing concentrations of sulfuric acid as high as 62%, n-amyl alcohol and iso-amyl alcohol each as high as 43% and isobutanol as high as 33%.

Figure 2:
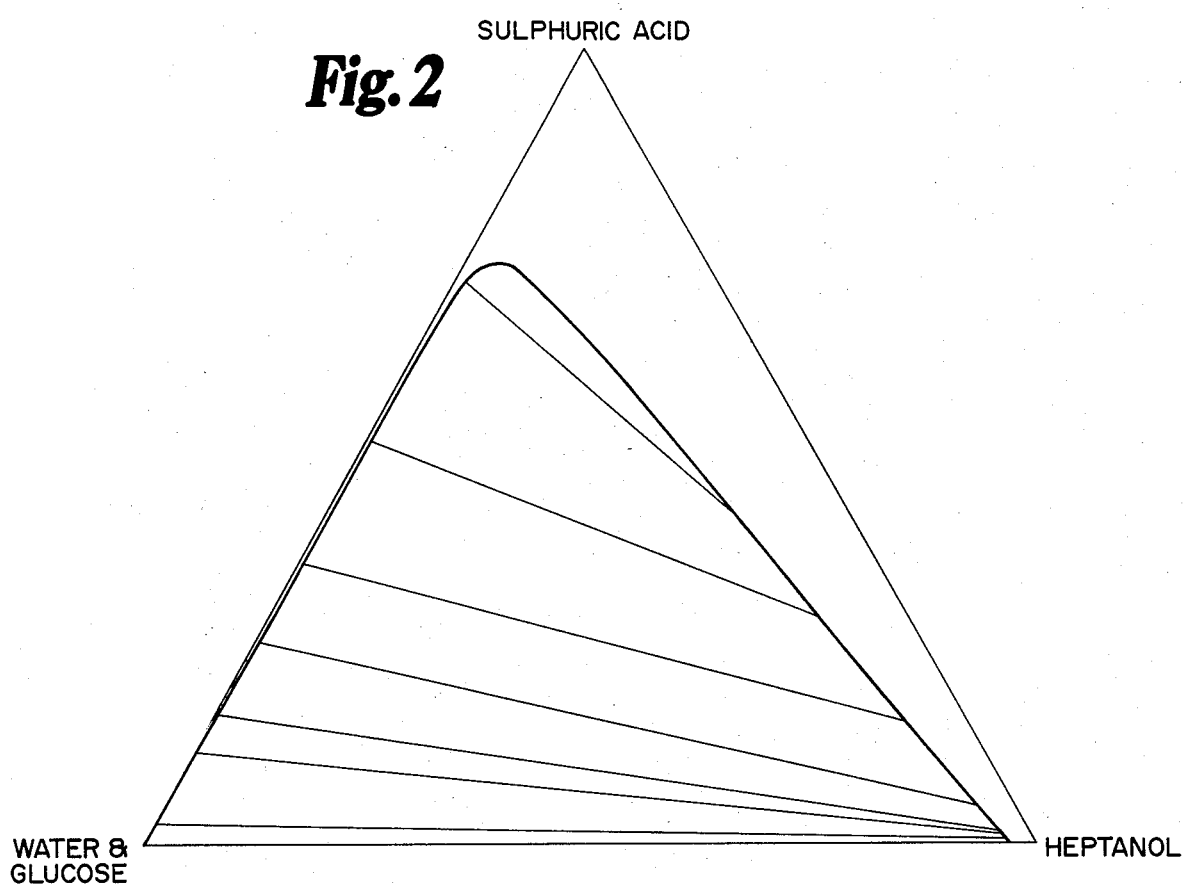
FIG. 2 is a ternary phase diagram showing phase equilibrium data for the preferred Solvent I, heptanol.

In the experimental procedure for developing the above mentioned phase equilibrium data, a predetermined quantity of a synthetic hydrolyzate solution was brought into contact with differing amounts of various extracting solvents and then shaken vigorously in a separatory funnel. After allowing the mixture to separate into two equilibrium phases, the top being the extract phase and the bottom being the raffinate phase, the components of each phase were measured. The following Table 1 is a summary of this data for the preferred solvent, heptanol. FIG. 2 reflects this same data in the form of a ternary phase diagram.

TABLE 1

Equilibrium Data for $H_2SO_4$, Water and Heptanol

| Extract Phase | | | Raffinate Phase | | |
|---|---|---|---|---|---|
| A | B | S | A | B | S |
| 96.7 | 3.0 | 0.3 | 3.4 | 0.3 | 96.3 |
| 87.7 | 11.8 | 0.5 | 3.5 | 0.5 | 96.0 |
| 83.0 | 16.5 | 0.5 | 3.6 | 0.8 | 95.6 |
| 73.9 | 25.5 | 0.6 | 4.2 | 4.8 | 91.0 |
| 64.0 | 35.3 | 0.7 | 6.8 | 15.5 | 77.7 |
| 48.6 | 50.6 | 0.8 | 9.9 | 27.5 | 62.6 |
| 28.0 | 71.0 | 1.0 | 13.0 | 41.4 | 45.6 |

A = Water
B = $H_2SO_4$
S = Heptanol

In addition to the $C_4$–$C_7$ alcohols, other solvent systems containing these alcohols as a major component may be used as well. For example, these alcohols have been mixed together and have also been combined with various other solvents, with the resulting mixtures showing effectiveness as extracting solvents in the process of the present invention. Although it is contemplated that these other solvents can be present and effective in various concentrations, the $C_4$–$C_7$ alcohols must constitute a major portion of the extracting solvent system. Accordingly, the extracting solvent system should have a $C_4$–$C_7$ concentration of at least 50% and preferably at least 75%.

In the preferred procedure, the sugar-rich raffinate from extraction column 21 which exits through stream 3 contains approximately 90% water, 10% sugar and negligible amounts of alcohol and sulfuric acid. This stream 3, in the preferred process, is neutralized by the addition of lime or other similar material and fed to a fermentation system to produce chemicals or used to recover crystalline glucose.

The acid-rich extract phase in stream 4 contains the solvent introduced in stream 2, along with the extracted sulfuric acid and water. In the preferred method using heptanol, stream 4 comprises approximately all of the sulfuric acid originally in the hydrolyzate. In the preferred procedure, a material balance shows that stream 4 contains approximately 79.4% Solvent I, 14.5% sulfuric acid, 5.3% water and the remainder sugar.

This stream 4 is then directed to a second extraction column 22 for the purpose of separating sulfuric acid from Solvent I. It should be noted that sulfuric acid is not volatile; thus it cannot be effectively separated from Solvent I or the stream 4 by distillation techniques. In the extraction column 22, a second extraction solvent ("Solvent II") is introduced via stream 5 to preferentially extract Solvent I from the sulfuric acid. Included as preferred solvents for this purpose are benzene, toluene and carbon tetrachloride, although it is contemplated that various other solvents with an affinity for organics, but not water, may be used as well. These include solvents such as chloroform and ether. The extraction column 22, like the column 21, can be of various constructions, although the preferred procedure contemplates a countercurrent column.

Figure 3:
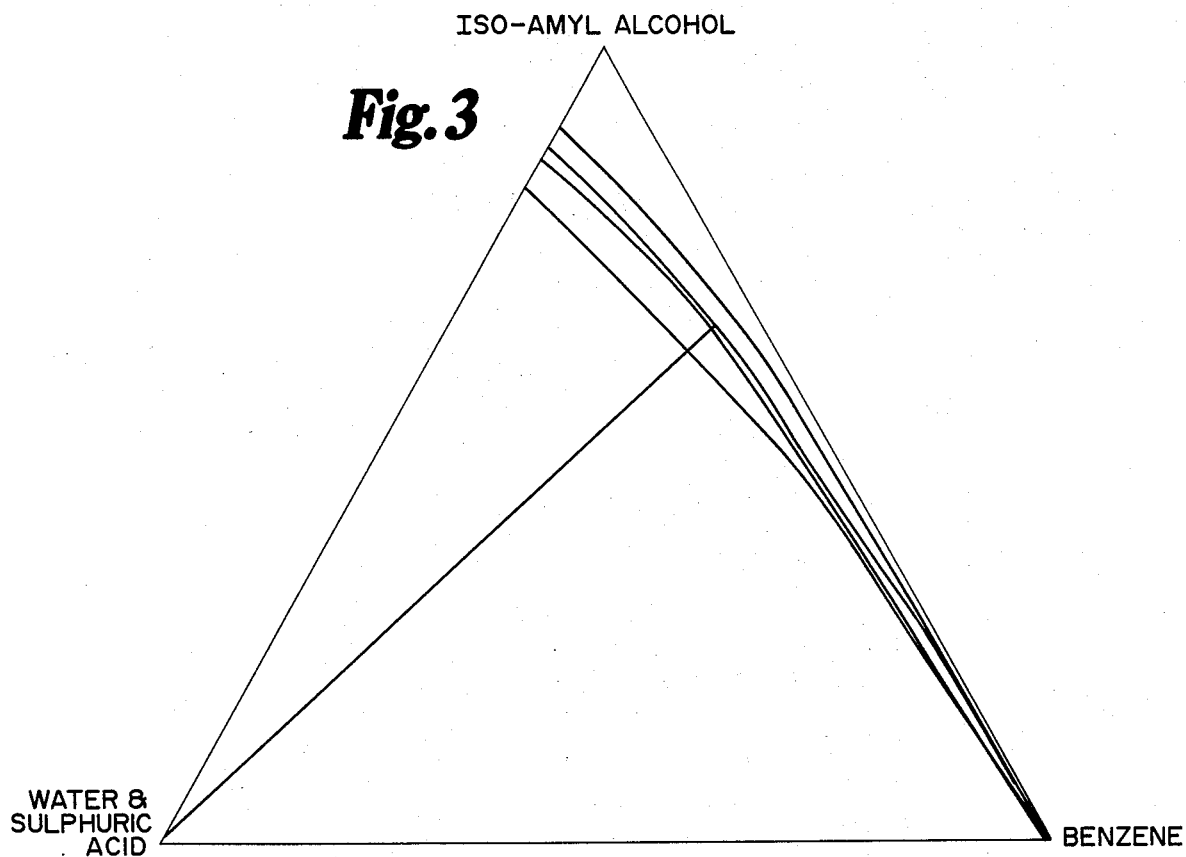
FIG. 3 is a ternary phase diagram showing equilibrium data of a Solvent I (iso-amyl alcohol), sulfuric acid, water, and Solvent II (benzene) system.

The specific behavior of various extracting solvents in the extraction column 22 can be determined by developing equilibrium phase data in the same manner as described above with respect to the solvents for the extraction column 21. For example, various amounts of the second extracting solvent were combined with a solution of water, $H_2SO_4$ and a $C_4$–$C_7$ alcohol (for each of several $H_2SO_4$ concentrations). This mixture was then shaken and allowed to separate. Because of the properties and relationship of the solvents, none of Solvent II remained in the raffinate phase. In other words, of the concentrations involved, 100% of Solvent II remained in the extract phase. The concentrations in each of the phases was determined and then plotted on a ternary phase diagram. FIG. 3 shows such a diagram for benzene with iso-amyl alcohol being utilized as Solvent I. The following Table 2 is the experimental data used to develop the diagram of FIG. 3. In both FIG. 3 and Table 2, the raffinate phase data has been omitted because it contains no Solvent II.

TABLE 2

Equilibrium Data for Water/$H_2SO_4$, iso-amyl alcohol and benzene

| Conc. of $H_2SO_4$ | Extract Phase | | |
|---|---|---|---|
| | A | B | S |
| 0.0% | 0.4 | 2.0 | 97.5 |
| | 0.6 | 21.4 | 77.9 |
| | 1.0 | 40.0 | 59.0 |
| | 1.9 | 61.1 | 37.0 |
| | 5.4 | 77.0 | 17.6 |
| | 9.9 | 89.7 | 0.3 |
| 20.0% | 1.5 | 6.8 | 91.7 |
| | 1.5 | 27.9 | 70.6 |
| | 3.6 | 50.1 | 46.2 |
| | 6.7 | 70.5 | 22.7 |
| | 12.3 | 86.9 | 0.7 |
| 30.0% | 1.4 | 2.0 | 96.5 |
| | 2.0 | 12.6 | 85.6 |
| | 3.3 | 37.1 | 59.6 |
| | 4.0 | 50.0 | 46.0 |
| | 8.2 | 73.3 | 18.5 |
| | 13.7 | 85.5 | 4.6 |
| 40.0% | 1.5 | 2.0 | 96.5 |
| | 2.5 | 17.2 | 80.3 |
| | 3.9 | 37.0 | 59.1 |
| | 6.2 | 43.0 | 50.8 |
| | 11.0 | 65.6 | 23.2 |
| | 17.0 | 80.3 | 2.7 |

Following the development of such data, it was determined that the three solvents identified above, namely, benzene, toluene and carbon tetrachloride, are preferred.

The acid-rich raffinate from the extraction column 22, which exits via stream 6, contains essentially all of the sulfuric acid and water fed in stream 4. This is the recovered sulfuric acid which is recycled for use in the main acid hydrolysis process. To the extent small amounts of sugar remain in stream 6, it is not lost since it is recycled back through the system along with the $H_2SO_4$. The extract phase from this second extraction which exits via stream 7 contains both Solvents I and II initially introduced via streams 2 and 5, respectively, with a very small amount of sulfuric acid. The Solvents I and II in stream 7 are finally separated by distillation in a conventional distillation unit 23 to yield streams 8, and 9 for recycle. Stream 8 which contains the Solvent II (i.e. benzene, toluene, carbon tetrachloride, or other organic solvent) is recycled to stream 5, while stream 9, which contains the Solvent I (i.e. $C_4$–$C_7$ alcohols) is recycled to stream 2. To the extent stream 9 also contains small amounts of sugar and $H_2SO_4$, these are not lost since they are recycled back through the system along with the recovered Solvent I. In the preferred method, vacuum distillation is employed in the distillation unit 23 to yield streams 8 and 9 to prevent the reaction of alcohols with residual sulfuric acid. Vacuum distillation allows the separation of solvents at reduced temperatures in comparison to the higher temperature atmospheric distillation.

Although the description of the preferred procedure has been quite specific, it is contemplated that various modifications could be made without deviating from the spirit of the present invention. Accordingly, it is intended that the scope of the present invention be dictated by the appended claims rather than by the description of the preferred procedure.

We claim:

1. A method of recovering sulfuric acid from the crude product obtained from the acid hydrolysis of a cellulose-containing material, said method comprising the steps of:

contacting the crude product with a solvent comprising at least 50% of one or more of the $C_4$–$C_7$ alcohols and separating said product into a sulfuric acid enriched alcohol phase and a sulfuric acid depleted aqueous phase; and separating the phases and recovering the sulfuric acid from the sulfuric acid enriched alcohol phase.

2. The method of claim 1 wherein said contacting step is carried out in a countercurrent extraction column.

3. The method of claim 1 wherein a mixture of two or more of the $C_4$–$C_7$ alcohols are present in said solvent.

4. The method of claim 1 wherein said solvent comprises at least 75 percent of the $C_4$–$C_7$ alcohols.

5. The method of claim 4 wherein said solvent consists essentially of the $C_4$–$C_7$ alcohols.

6. The method of claim 1 including separating and recovering the sulfuric acid from the sulfuric acid enriched alcohol phase by an additional extraction procedure.

7. The method of claim 6 wherein said additional extraction procedure utilizes a solvent selected from the group consisting of benzene, toluene, carbon tetrachloride, chloroform and ether.

8. The method of claim 7 wherein said additional extraction procedure separates said sulfuric acid enriched phase into a raffinate phase consisting essentially of sulfuric acid and water and an extract phase consisting essentially of the solvent used to contact the crude product and separate it into a sulfuric acid enriched alcohol phase and a sulfuric acid depleted aqueous phase and the solvent used in the additional extraction procedure and further including the step of separating and recovering said solvents from each other by distillation.

9. The method of claim 8 wherein said distillation is carried out under vacuum.

* * * * *

UNITED STATES PATENT AND TRADEMARK OFFICE
CERTIFICATE OF CORRECTION

PATENT NO. : 4,608,245

DATED : August 26, 1986

INVENTOR(S) : James L. Gaddy et al.

It is certified that error appears in the above-identified patent and that said Letters Patent is hereby corrected as shown below:

In column 6, line 14, add the words:
"A = Water/$H_2SO_4$   S = Benzene   B = Iso-amyl alcohol"

Signed and Sealed this

Twenty-fourth Day of March, 1987

Attest:

DONALD J. QUIGG

Attesting Officer

Commissioner of Patents and Trademarks